US006311424B1

(12) United States Patent
Burke (10) Patent No.: US 6,311,424 B1
(45) Date of Patent: Nov. 6, 2001

(54) TELESCOPE FOR WEAPONS AND OTHER APPLICATIONS

(76) Inventor: Peter G. Burke, 59 Maryland St., New Orleans, LA (US) 70124

( * ) Notice: Subject to any disclaimer, the term of this patent is extended or adjusted under 35 U.S.C. 154(b) by 0 days.

(21) Appl. No.: 09/407,636

(22) Filed: Sep. 28, 1999

(51) Int. Cl.$^7$ ........................................................ F41G 1/00
(52) U.S. Cl. ........................ 42/118; 42/119; 42/111; 89/200; 89/201; 89/202; 89/203; 89/204; 89/205; 89/206
(58) Field of Search ............................ 33/223, 228, 227, 33/245, 255, 233, 249, 247, 248, 246; 42/100, 101, 118, 119, 111; 89/200, 201, 202, 203, 204, 205, 206

(56) References Cited

U.S. PATENT DOCUMENTS

| | | |
|---|---|---|
| 694,904 | 3/1902 | Youlten . |
| 1,371,964 | 3/1921 | Yaggi et al. . |
| 2,529,801 | 11/1950 | Fisk . |
| 2,639,507 | 3/1953 | Pachmayr . |
| 2,653,386 * | 9/1953 | Winton ..................................... 33/56 |
| 3,441,270 * | 4/1969 | Nielsen ..................................... 272/8 |
| 3,749,494 * | 7/1973 | Hodges ..................................... 356/16 |
| 4,878,305 * | 11/1989 | Gabrilidis ................................. 42/72 |
| 5,103,567 * | 4/1992 | Loving ..................................... 33/245 |
| 5,276,554 * | 1/1994 | Nassivera ............................. 359/694 |
| 5,456,035 * | 10/1995 | Stiles ..................................... 42/100 |
| 5,606,818 * | 3/1997 | Hardee ................................... 42/101 |
| 5,694,202 * | 12/1997 | Mladjan et al. ..................... 356/4.01 |
| 5,771,623 * | 6/1998 | Perntich et al. ...................... 42/101 |
| 5,793,528 * | 8/1998 | Wallace et al. ...................... 359/419 |

FOREIGN PATENT DOCUMENTS

| | | | |
|---|---|---|---|
| 004113300 * | 10/1992 | (DE) | ................................ F41G/1/08 |
| 0315892 * | 5/1989 | (EP) | ................................ F41G/3/32 |

* cited by examiner

Primary Examiner—Michael J. Carone
Assistant Examiner—John Richardson
(74) Attorney, Agent, or Firm—Shawn D. Sentilles (57) ABSTRACT

A telescope apparatus and system for rifles and other weapons comprising a forward portion, consisting of a forward objective lens fixed on the front end of a firing line light tube, held firmly to the weapon by slip springs in which the forward light tube may be rotated, and/or a side optics system extending perpendicular to the rear of the forward portion of the telescope may be turned and locked on the forward portion, so that the side optics system of the telescope, extending a preferred distance to the side of the weapon, may be positioned and fixed at the preference of a person, forward or back and on the left or right side of the weapon, or other preferred positions, and aimed by a person sighting through the viewing lens system of the telescope at the end of the side optics system, using conventional, manual aiming devises and/or aiming the weapon by means of electronically controlled laser aiming devises, together with attachable range finding and other devises.

22 Claims, 6 Drawing Sheets

TELESCOPE FOR WEAPONS AND OTHER APPLICATIONS

FIELD OF INVENTION

The invention relates to a telescope apparatus and system for use on rifles and other weapons, together with related devices.

PRIOR ART

Conventional telescopes for rifles and other weapons consist of a single long tube containing optics which magnify and display an image of a target by means of a forward objective lens and a rear viewing lens systems situated over the top centerline of the weapon. In this configuration, a user has to position his head against the weapon and generally has to use the eye closest to the weapon whether or not that eye is adequate for the purpose of viewing through the telescope, or alternatively to hold the weapon in an unnatural position.

When sighting through a conventional telescope on a rifle, the user has to "cock" and hold his head firmly against the weapon in order to view through the telescope, by bending the neck and head towards the weapon and moving the head down so that the image is focused through the optics system without distortion at a particular distance from the viewing lens to the retina of the eye. Due to the nature of the construction of conventional telescopes, a user has to simultaneously align the weapon and telescope, and his neck, head and eye, so the image of the target is fully round and in focus with the reticle (cross-hairs), without distortion of the image through the optics system and without interference or impingement on the image by internal portions of the telescope. Thus a person may have to assume an unnatural position, with movements of neck, head, eyes and body, and movements of the weapon, more so to accommodate use of the telescope and weapon when a person has diminished sight of one eye and/or diminished movements of the head and/or neck, particularly an eye closest to the weapon when held naturally by a person. (For example, a right handed person with impaired vision in the right eye).

Using a conventional telescope when firing a weapon, with the head held firmly against the weapon, results in recoil of the weapon being transmitted directly to the face, which may cause "flinching" or other protection motions of the face and eyes before firing, at moment of fining, and/or after firing the weapon, and corresponding loss of sight of the target and aiming devices in the telescope, and loss of focus though the optics system, sometimes at the critical moments of flight of the bullet towards and impact on the target.

Using a conventional telescope when firing a weapon, with the head held firmly against the weapon, results in recoil of the weapon being transmitted directly to the face, which may cause "flinching" or other protection motions of the face and eyes before firing, at moment of fining, and/or after firing the weapon, and corresponding loss of sight of the target and aiming devises in the telescope, and loss of focus though the optics system, sometimes at the critical moments of flight of the bullet towards and impact on the target.

For magnification and other purposes, conventional telescopes may also extend farther forward on the rifle, beyond the supporting hands of the person, increasing the distance of travel of the objective lens, horizontally and vertically, when the person is sighting through the telescope, and increasing the effects of motions, vibrations, and recoils of the weapon, before, during and after firing the weapon, causing loss or distortions of the image of the target. For that reason, the length of other telescopes and binoculars has been reduced for many years by means of mirrored surfaces.

Conventional telescopes do not incorporate automatic adjustments of the aiming systems to assure vertical and horizontal alignment of the weapon and telescope to avoid the effects of the position of the weapon and/or telescope from true vertical and/or horizontal positions.

Use of laser aiming devices in a conventional telescope may present difficulties as direct light from lasers may be transmitted or reflected into the eye of a person sighting through the viewing lens system of a telescope, and/or may not provide a preferred and accurate surface for display of aiming points of light together with electronic adjustments of the aiming points of light.

The use of mirrors to direct light through bent light tubes for use as rifle sights is known in the art. U.S. Pat. No. 694,904 (Youlten) discloses a gun sight apparatus consisting of two or more mirrors or other reflecting surfaces mounted in a bent light tube in such a. manner that the first reflecting surface may come behind the sights of the gun and in the line of aim of the gun, while the last reflector comes in front of the gunner's eye and enables the gunner to aim the gun without exposing himself to enemy fire. (Col. 1, lines 17–25) The reflecting instrument is made of two tubes fitted together by means of a cylindrical flange or projection. The first tube has two mirrors and the second tube has two mirrors. (Col. 2, lines 53–64)

U.S. Pat. No. 1,371,964 (Yaggi et al). discloses a gun sight apparatus consisting of an adjustable tube or set of tubes, at least one of which is set in a vertical/perpendicular orientation relative to the line of fire. A set of cross hairs is set in the vertical tube. The tubes contain two or more reflecting or refracting mirrors or prisms. One of the reflecting or refracting surfaces is placed in an adjustable or non-adjustable frame at the upper end of the perpendicular tube and in line with the target. A second reflecting or refracting surface is set in an adjustable or non-adjustable frame at the lower end of the vertical tube, so that rays of light striking the upper reflecting or refracting surface are carried to the lower reflecting or refracting surface, and from there carried to the gunner's eye through an eye piece or tube. In this manner, the target can be seen by the gunner below the line of fire of the gun, the distance below being equal to the length of the vertical tube. The perpendicular tube may either be a one piece tube or a telescoping tube.

The aforementioned designs are intended primarily for allowing the gunner to conceal himself from his intended target. As such, they require a bracing apparatus depending below the gun to form a shoulder brace below the butt of the gun.

There is a need for an apparatus for aiming at a target along a firing line of a weapon; such as a rifle, bow, cross-bow or the like, that meets the following objectives.

SUMMARY OF INVENTION

1. In order to avoid or minimize the above factors inherent to a conventional telescope, the basic objective of the present invention is to provide a telescope apparatus providing a means of sighting through a viewing lens systems situated at a preferred distance on either side of the weapon.

2. Another objective is to permit the rotation of the side optics system to either side of the weapon, to accommodate both right and left handed persons.

3. Another objective is to permit movement of the telescope forward and back on the weapon, and rotation of the side optics system of the telescope to any position, limited only by the body of the weapon, to accommodate the preferences of a person using the weapon when sighting through the telescope, with reduction of the time necessary to position an eye for viewing through the telescope and focusing and aiming at a target.

4. Another objective is to provide a means whereby a person might conveniently use either eye or both eyes when sighting through the telescope without assuming an unnatural position.

5. Another objective is to limit contact by the head of a person against a weapon, reducing the movements of the head and unnatural positions of the head and neck when sighting through a telescope.

6. Another objective is to reduce the tendencies of a person to "flinch", or voluntarily or involuntarily to tighten facial and neck muscles or make other protective movements of the head and eyes, when firing a weapon, in order to assure continuous sighting of and aiming at a target through the telescope before, during and after firing the weapon.

7. Another objective is to provide means to cushion or otherwise reduce the effects of recoil of a weapon on the face and eye of the person viewing through the telescope.

8. Another objective is to provide a means of folding the side optics system of the telescope against the forward part thereof, while carrying the weapon or securing the telescope in a case or bag, with mechanisms to firmly lock the side portion onto forward portions of the telescope when the side optics system is both folded and extended for use.

9. Another objective is to provide for the removal of the telescope from the rifle or other weapon, for securing in a case or bag, or for attachment to another weapon or device.

10. Another objective is to provide a telescope usable by persons with diminished movements of the head and/or neck, and/or diminished sight in one eye.

11. Another objective is to be able to move the objective lens of the telescope further back on the weapon, reducing the effect of movement thereof, horizontally and vertically, and loss or distortion of the image, when a person is sighting through the telescope before, during and after firing the weapon.

12. Another objective is to position mirrors at the end of the light tubes of telescopes to provide an aligned view through the light tubes, avoiding or minimizing the effect of impingement of internal portions of a telescope on the image when a person sights through the viewing lens.

13. Another objective is to provide an alternative means for aiming the telescope at a target through the forward portion thereof, using manual aiming devices in the forward portion thereof, when the side optics system is unlocked and folded forward.

14. Another objective is to permit use of either conventional, manual sighting devices in the telescope automatically aligned to a preferred position by the dual mirror system, and/or electronically controlled laser and other devices for aiming a weapon by means of points of light on mirrors, without direct reflection of that light through the telescope into the eye of a person.

15. Another objective is to permit adjustments of the laser aiming devices and other devices in a number of manners, including alignment of the telescope with the weapon and other adjustments of the laser aiming devices, including adjustments for various types of ammunition, for vertical and horizontal positions of the weapon and telescope, for range to target, for wind and air distortion (mirage) conditions and for other adjustments preferred by a person.

16. Another objective is to permit attachment to the telescope of other devices, which may electronically transmit signals into the electronics of the telescope for adjustment of the laser aiming devices, including range to a target, and/or to provide night, telephoto, compass and other views with data in the direction of a target.

17. Another objective is to provide means of sighting through both the telescope and attached device simultaneously or individually, while making adjustments in the electronic devices and laser aiming devices of the telescope.

18. Another objective is to provide a means of displaying in the viewing lens of the telescope of the adjustments of the electronic devices and other, data preferred by the person sighting through the telescope.

19. Another objective is to provide means for transmission of data from the electronics of the telescope to another telescope or separate monitor, to permit view of the adjustments and alignment of the telescope by an instructor or another person.

In order to achieve the aforementioned objectives, the present invention is characterized as a telescope apparatus comprising an objective lens in a forward or aim-line light tube attached to a rifle or other weapon by slip rings or other holding devices which may be loosened and tightened to permit the forward tube to be moved forward or back and to be rotated in the slip rings for positioning of a side optical system with the viewing lens system on the right or left side of the weapon, or in any other position preferred by a person viewing through the telescope, with the side optics system extending a preferred distance substantially perpendicular to the rear of the forward tube, through which images from the objective lens are reflected by a mirror at the rear of the forward tube, and reflected by a mirror at the end of the side optics system through a viewing lens system, each of those mirrors providing a fixed view through the light tube to minimize distortion of the image. The telescope may also incorporate a lock ring to allow rotation of the side optics system without loosening the locking devices on the slip rings or other holding devices supporting and holding the forward tube. The telescope may also be manufactured in a configuration whereby the forward portion thereof may be used for aiming at a target using conventional aiming devices (reticles, such as cross-hairs and the like), when the side optics system is unlocked and folded forward. The telescope may also be manufactured in a configuration whereby a person may use both eyes to sight through two viewing lens. In this embodiment, incorporating conventional, manual aiming devices (conventional reticles, such as cross-hairs and the like in the forward tube and/or side optics system) which are automatically aligned in the preferred position by the dual mirror system, and with the ability to fold the side optical system alongside the forward tube and slip rings, and to lock the side optics system to the forward optics system when extended for use, the telescope apparatus would achieve the first thirteen objectives stated above (1–13).

One embodiment provides a convenient apparatus for incorporation within the telescope of electronic devices, with electrical power supplied by battery, to control, vertically and horizontally, laser aiming devices which would be attached substantially perpendicular to the center of mirrors in the telescope apparatus, whereby lights emitted by the laser devices would be displayed on the mirrors for initial adjustment of the aiming devices of the telescope to the particular weapon, and adjustments when the telescope is aimed at a target, including adjustments for range, for vertical and horizontal positions of the weapon and telescope, for various types and characteristics of ammunition, for wind effects, for air distortion effects (mirage) and for other preferred adjustments. This embodiment would achieve the fourteenth and fifteenth objectives stated above (14 and 15).

Another embodiment provides a further convenient means for attaching devices to the telescope, including range finders, telephoto systems, compasses, night vision systems, and combinations thereof, in a manner that would permit the user to view through the viewing lens of both the telescope and attached device, simultaneously or individually, and to cause data in the electronics in the attached device to be transmitted to the electronics in the telescope for adjustment of the laser aiming devices. This embodiment would achieve the sixteenth and seventeenth objectives stated above (16 and 17).

The foregoing embodiments provide a further means for the display in the viewing lens of the telescope of the adjustments of the laser devices, and to permit the transfer of that data from the electronics of the telescope to another telescope or monitor for use by an instructor or another person. This embodiment would achieve the eighteenth and nineteenth objectives stated above. (18 and 19).

BRIEF DESCRIPTION OF DRAWINGS

FIG. 1 preferred embodiments of the invention will now be described with reference to the accompanying drawings. While the drawings are generally in relation to use of the telescope on a rifle or other firearm, there is no intention to limit the use of the telescope, which may be modified, with suitable holders and other devices, for use on cross-bows, compound and conventional bows, other firing weapons, and the like.

The is a top view of one embodiment of the invention showing the side light tube extended for use.

DETAILED DESCRIPTION OF PREFERRED EMBODIMENTS

The preferred embodiments of the invention will now be described with reference to the accompanying drawings.

Figure 1:
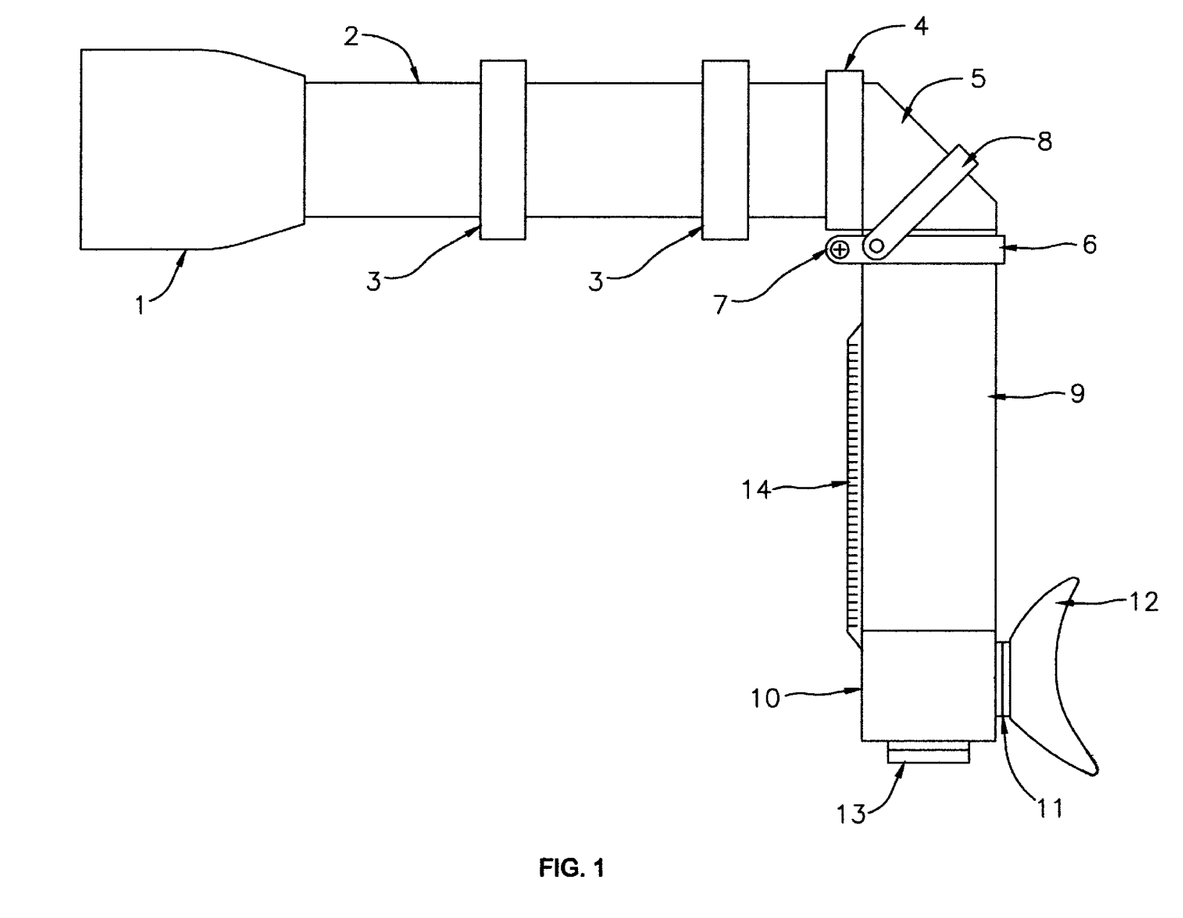

FIG. 1 is a top view of a preferred embodiment of an apparatus for aiming at a target along a firing line of a weapon, such as a rifle, bow, cross-bow or the like, showing the apparatus extended for use. In the embodiment shown in FIG. 1, the target light input end of the firing line light tube 2 has a round hood 1 enclosing and protecting an objective lens (not shown). The rear portion of the hood is screwed onto the front end of the firing line light tube 2. The firing line light tube 2 is preferably rotatable. The firing line/rotatable light tube 2 is supported by one or more slip ring supports 3, which may be tightened at the base (not shown) to lock the tube in a preferred position. The rear of the rotatable light tube 2 is screwed into a rear manifold 4 to which is affixed a rear reflector body 5.

A first mirror 23 (not shown in FIG. 1; see FIG. 5) is positioned to receive target light from the firing line light tube. In a preferred embodiment, the first mirror 23 is positioned substantially in the light output end of the firing line light tube 2, such as in a rear reflector body 5 thereon (see FIGS. 1 and 5). In the preferred embodiment shown most clearly in FIGS. 1 and 5, the first mirror 23 is enclosed in rear reflector body 5. The first mirror 23 is fixed at an angle of substantially 45 degrees to the line of light entering the objective lens and traveling through the rotatable light tube 2 to the mirror, aligning the image without impingement by internal structures of the rotatable light tube 2. The light is reflected by the mirror 23 through a side manifold 6 supported by a hinge 7 formed by the forward side of the side manifold 6 and the left side (in the viewed position) of the rear manifold 4, and held together by a pin.

The apparatus of the invention is provided with a side light tube 9 having an eye opening 11. A target light input end of the side light tube 9 is pivotally connected to the target light output end of the firing line light tube 2, such as by hinge 7. The rear reflector body 5 and associated components provide a means for selectively forming a light-tight junction between the rotatable/firing line light tube 2 and the side light tube 9. With the light-tight junction formed, as shown in FIG. 1, the reflected light travels through the side manifold 6 and side light tube 9 affixed to the side manifold 6, which may be either square or round. In one preferred embodiment, the first mirror 23 is positioned substantially in the light input end of the side light tube 9, such as in a rear reflector body 5 thereon (see FIG. 7); this particular embodiment is preferred when the side light tube 9 is rotatably connected to the firing line light tube, as described in further detail below. A second mirror 24 (not shown in FIG. 1; see FIG. 5) is positioned in the side light tube 9 so as to receive the target light from the first mirror 23 and reflect target light through the eye opening 11. In the preferred embodiment shown most clearly in FIGS. 1 and 5, the second mirror 24 is enclosed in a rear light reflector body 10, and is fixed at an angle of substantially 45 degrees to reflect target light into and through eye opening 11, aligning the view without distortion by internal structures of the side optics system 5–12 (throughout this specification, the term "side optics. system 5–12" shall refer generally and collectively to the individual components of the side optics system, namely rear reflector body 5, side manifold 6, hinge 7, swing lock arm 8, side light tube 9, rear light reflector body 10, eye opening 11, and eye hood 12). A viewing lens system (not shown) is preferably fixed in the rear of the rear light reflector body 10, including preferably in eye opening 11. A holder 11 is preferably positioned or formed in eye opening 11, such as around the viewing lens system, to which may be attached an eye hood 12, shown in this view in a position for viewing with the left eye. The eye hood 12 also may be rotated on the holder 11 for viewing with the right eye.

In order to promote light tight sealing between the firing line light tube 2 and the side light tube 9, the apparatus is preferably provided with a first gasket 18 in the light output end of the firing line light tube 2 and a second gasket 18 in the light input end of the side light tube 9, the gaskets together providing substantially light-tight sealing of the light-tight junction. (See FIGS. 3 and 5) In one such embodiment, the side manifold 6 is further supported by a gasket 18 fixed in the side manifold 6 which fits into a gasket 18 fixed in the rear reflector body 5, and is further supported and held against the rear reflector body 5 by a swing lock arm 8 held by and rotating on pins 8a on the side manifold 6 and pressed onto the sloping rear end of the rear reflector body 5.

The telescope is shown with the side optical system 5–12 on the left side of a rifle or other weapon, which may be preferred by a right-handed person. However, in a preferred embodiment, the firing line light tube 2 is selectively rotatable relative to the firing weapon, such that the side light tube may be selectively positioned on either side of the firing weapon. The apparatus is provided with a means for securely mounting the apparatus on the firing weapon. In a preferred embodiment, the means includes one or more adjustable slip rings 3 substantially encircling the firing line light tube 2, each of the slip rings 3 having an adjustment means 15 thereon for selectively loosening and tightening the slip rings 3 to thereby permit selective rotation of the firing line light tube 2 relative to the weapon. By loosening the tightening devices 15 (see FIG. 2) at the bases of the slip ring supports 3, the rotatable light tube 2 may be rotated 180 degrees, more or less, with re-tightening of the devices of the slip ring supports to fix the side optical system on the right side of the rifle or other weapon, which may be preferred by a left-handed person. In the same manner, the rotatable light tube 2 may be rotated and fixed to permit viewing through the lens of the side optical system in any position, limited only by the body of the rifle or other firearm. In a preferred embodiment, the firing line light tube 2 may be selectively positioned forward or back relative to the firing weapon by loosening slip ring supports 3, sliding the firing line light tube 2 forward or backward in the slip ring supports 3, and re-tightening the slip ring supports 3.

One or more magnifying lenses are preferably positioned in at least one of the light tubes, the lenses being positioned and configured to deliver a magnified image of the target through the eye opening. Although the device is generally intended for use as a telescope, it is recognized that in many hunting and target shooting applications, it may be desirable to eliminate magnifying lenses so that the device may be used to permit aiming with the naked eye. For example, a right handed competition shooter who is blind in the right eye could use this embodiment to compete in events that do not permit the use of scopes.

Figure 2:
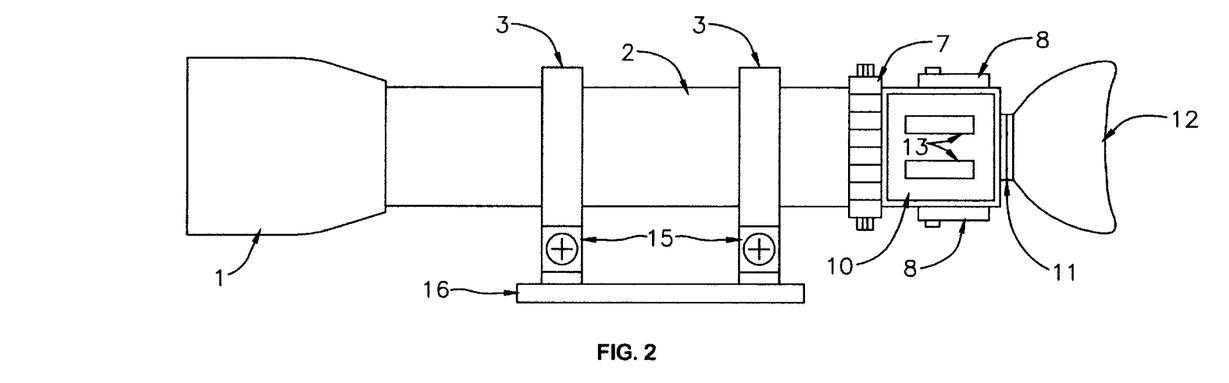
FIG. 2 is a side view of one embodiment of the invention, rotated 90 degrees from FIG. 1, showing the side light tube extended for use.

The apparatus of the invention is also preferably provided with an attachment means 13 on an outer surface of the side light tube 9 adjacent the light output end for permitting selective attachment of sight-enhancing accessories 19 to the apparatus. As shown in FIGS. 1–2, the attachment means may be guide rails 13 to which may be attached other small devices such as a telephoto lens systems, a night vision scope, a manual and/or laser rangefinder, a telescope with compass, and combinations of those devices.

In this embodiment, the side optical system 6–12 is in a form to permit viewing with an eye farthest from the rifle or other weapon. If preferred, the side light tube 9 may be shorter, with substitution of a longer rotatable light tube 2 or with adjustment or modification of the optical systems, if a person prefers to limit use of the telescope to an eye closest to the rifle or other weapon.

The apparatus of the invention is provided with a means, such as swing lock arm 8, on at least one of the light tubes 2, 9 for removably securing the light output end of the firing line light tube 2 to the light input end of the side light tube to thereby selectively secure the light-tight junction. The swing lock arm 8 is attached to and rotates around pins 8a on the side of the side manifold 6 and is configured to pivot over at least a portion of the reflector body 5 to thereby selectively secure the light input end of the side light tube 9 against the reflector body 5 in the light-tight junction position. The swing lock arm 8 may be a solid material, firmly locking the side manifold 6 to the rear reflector body 5, or the swing lock arm 8 may be composed of a flexible material, such as rubber. When incorporated and applied by rotation and pressing on the sloped rear side of the rear manifold 5, a flexible swing lock arm 8 provides a firm anchoring of the side manifold 6 to the rear manifold 5, and also permits the side optic system 5–12 to swing forward during recoil of the rifle or other weapon, then returns the side optic system to the extended and firm position after firing and recoil of the weapon.

Figure 5:
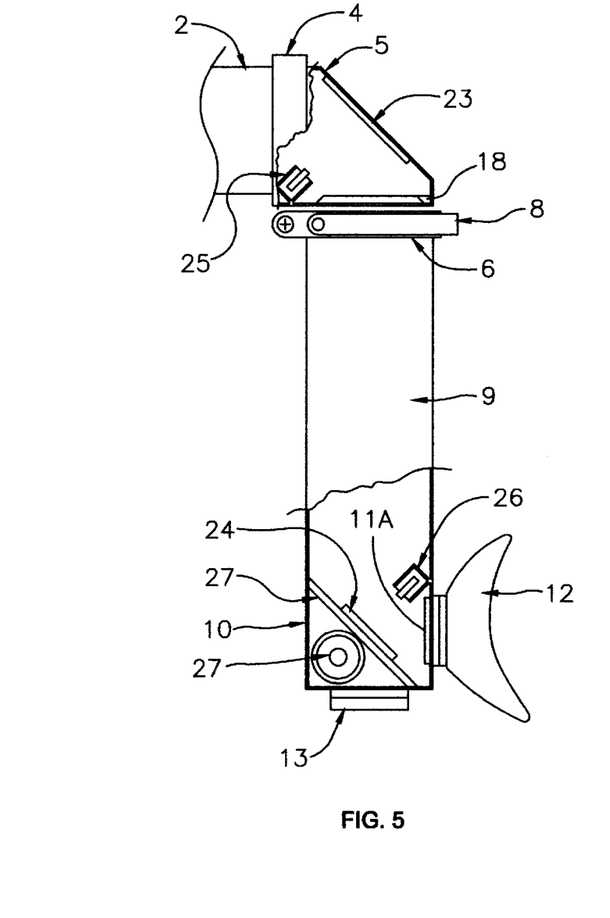
FIG. 5 is a partial cross-section top view of one embodiment of the rear reflector body and side optical system of the telescope with removal of the top sides of the rear reflector body, side light tube and side reflector body, and a portion of the rear manifold.
Figure 6:
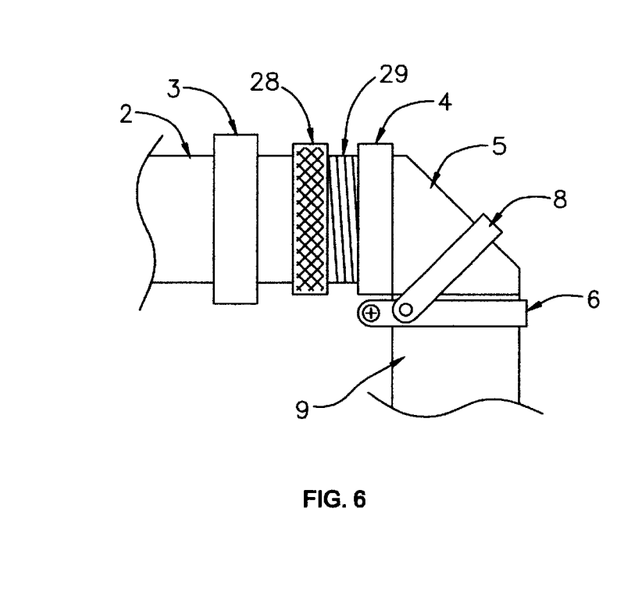
FIG. 6 is a top view of one embodiment of the rotatable light tube, rear manifold, rear reflector body, and side manifold, incorporating a locking ring to allow rotation of the side optics system.

In this embodiment, the telescope could incorporate laser aiming devices as shown in FIG. 5, or conventional, manual reticle (cross hairs or the like) aiming systems (not shown), situated in the rotatable light tube 2, with usual adjusting knobs (not shown), for which a person may prefer to firmly position the rotatable light tube 2 and manual aiming devices (not shown), with incorporation of a locking ring 28 for positioning of the side optics system 5–12 as shown in FIG. 6 and described below.

FIG. 2 is a view from the left side of the same telescope, extended as in FIG. 1. The rotatable light tube 2 is again shown in the slip ring supports 3. In this view the ends of a slip ring support 3 under the rotatable light tube 2 become flat surfaces, with the end of one side fixed to the base 16 and the other side attached to the fixed side by a screw or other device 15, which may be loosened to permit rotation of the rotatable light tube 2, then tightened to fix the rotatable light tube in a preferred position. The base 16, slip rings 3, and associated components provide a means 3 for securely mounting the firing line light tube on a weapon in substantially parallel relation to the firing line of the weapon. The slip rings 3 or base 16 would be attached to a rifle or other weapon in a manner provided by the manufacturer thereof. The slip ring support or supports 3 may be manufactured in various configurations. For example, the support rings 3 may be situated in closer proximity or may be a single, longer unit, permitting the rotatable light tube 2 to be positioned further forward or back in the ring support or supports 3, as preferred by a person. For convenience, the slip rings 3 may be manufactured in a manner to permit removal of the telescope from the slip ring supports 3. The telescope could then be placed in a carrying case, or assembled on slip ring supports of another rifle or weapon, or on other devices such as a tri-pod support for use as a telescope.

Also shown in FIG. 2 are the hinge 7 supporting the side manifold (not shown), the swing lock arm 8 which is held by and rotates on pins 8a situated on the side manifold, shown attached to the sloping side of the rear reflector body (not shown), two guide rails 13 at the end of the side light reflector 10 for attachment of other devices, the holder 11 fixed around the viewing lens system (not shown), and an eye hood 12 attached to the holder 11.

Figure 3:
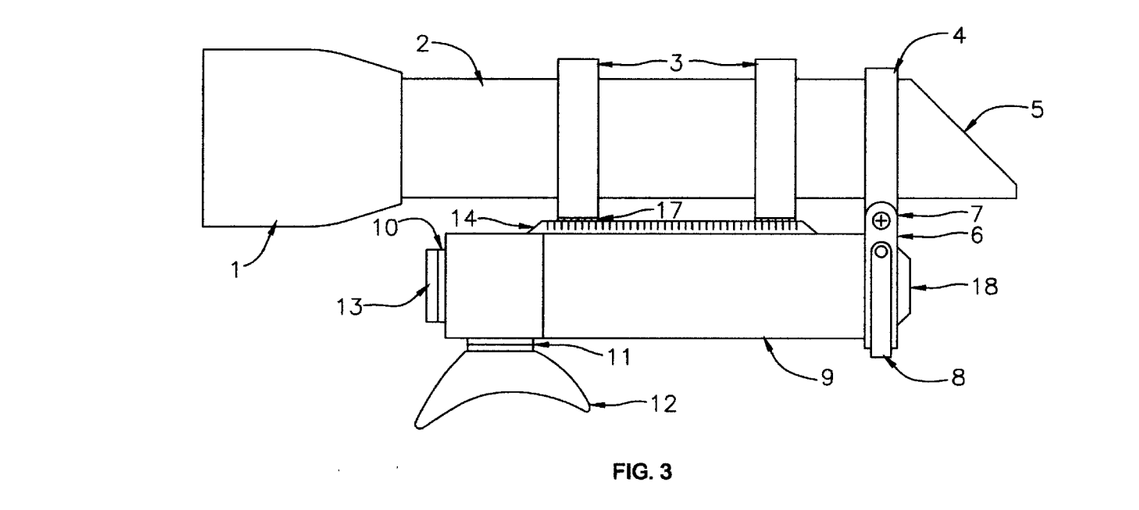
FIG. 3 is a top view of one embodiment of the invention showing the telescope in a folded position.

FIG. 3 is a top view of the telescope when folded. The telescope is folded by disengaging the swing lock arm 8 from the sloping end of the rear reflector 5, then rotating the side optic system 6–12 on the hinge 7 until it rests against the forward slip ring 3. The apparatus of the invention is preferably provided with a means on at least one of the light tubes for removably securing the side light tube 9 to the firing line light tube 2 when the side light tube 9 is folded against the firing line light tube 2, such as when the target light output end of the firing line light tube 2 and the target light input end of side light tube 9 are pivoted away from one another to a fully open position. As shown in FIG. 3, the locking system/securing means may consist of velcro tabs fixed to the front side of the side reflector body 14 and appropriate positions on the slip ring 17. Also shown in this view is a gasket 18 fixed in the side light manifold 8, which may be pressed into a gasket (not shown) affixed in the side manifold 6 when the telescope is extended.

Figure 4:
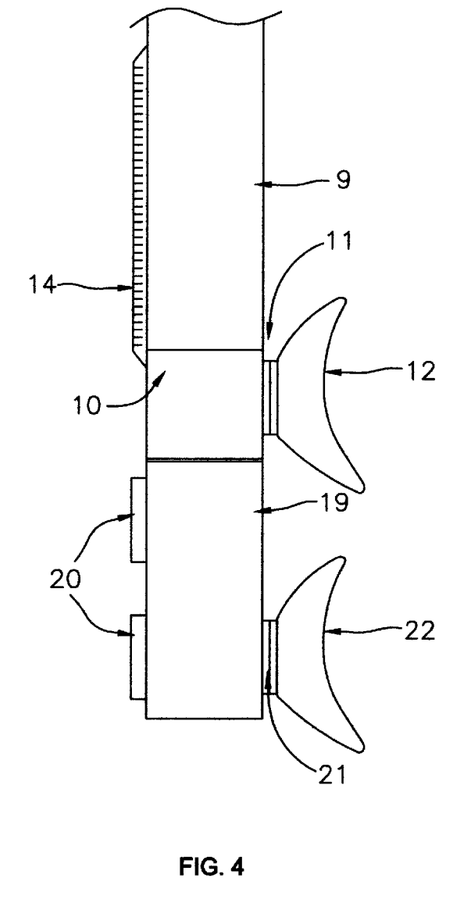
FIG. 4 is a top view of a side light tube of one embodiment of the invention, showing the attachment of a range finding devise.

FIG. 4 is a top view of a detachable device 19 attached to the end of the side reflector body 10 by means of groves (not shown) in the side of the device which are fitted onto the rails on the end of the side light reflector body (not shown in FIG. 4; see FIGS. 1, 2 and 3, reference number 13). As shown, the device represents an electrically powered telephoto range finder system. When the range to a target is determined by the device, the user may cause an electronic signal to be transferred from the device to the electronics (not shown) in the rear reflector body 10 by means of contacts in the groves of the device and in the rails (not shown) on the side light reflector 10, in a manner well known to those of skill in the art.

Also shown in FIG. 4 is a holder/eye opening 21 fixed around the viewing lens (not shown) at the rear of the device 19, on which is attached an eye hood 22 positioned for use by the left eye. In this embodiment the telescope eye hood 12 is adjusted for use by the right eye, so a person might view though both viewing lens or only one by closing the other eye. If preferred, guide rails (FIGS. 1, 2 and 3, reference number 13) could be added to the top side of the side light tube 9 and side reflector body 10, with corresponding groves in the under side of a devise, for positioning of the device on those groves.

FIG. 5 is a top view of the rear and side optical systems 4–12, with a portion of the rear manifold 4 removed, and the top portions of the rear reflector body 5, side light tube 9 and side light reflector body 10 removed, to show the position of a mirror 23 fixed on the rear side in the rear reflector body 5, and a mirror 24 fixed on a support plate 27 in the side light reflector body 10. In this view the swing lock arm 8 is disengaged from the sloping end of the rear reflector body 5, rotated on the pins 8a on and held on the side manifold 6.

While the telescope could be provided with conventional reticles (cross-hairs) and manual adjustment devices for aiming the rifle or other weapon at a target, in this embodiment a small red laser light and electronic device 25 is installed in the rear manifold 4, with the laser aligned perpendicular to the center of the mirror. Such laser and electronic devices are well known to those of ordinary skill in the art. The electronic device controls the position, horizontally and vertically, of the laser, which would be usually pointed towards the center of the mirror 23 to display a red aiming point on the mirror 23. This laser may also be adjusted using controls on the side light reflector body 10, with the adjustments stored in memory, when the telescope is mounted on a particular rifle or other weapon.

A second small green laser and electronic device 26 is installed in the side reflector body 10, with the laser aligned substantially perpendicular to the center of the mirror 24, together with a battery 27 which may power both laser devices 25 and 26 by means of wiring (not shown) from the battery to the laser devices. The electronic device controls the position of the green laser 26, which may be adjusted to point at various positions on the mirror 24. The laser in the side light reflector 26 could be adjusted to display a green point on various positions on the mirror 24, which adjustments might include: (a) a point ("initial point") temporarily stored in the memory of the electronic device when the telescope is mounted on a particular rifle or other weapon and test fired, or aligned with a point of light from a laser device fitted on or into the muzzle of the weapon at a determined range (for example, a target at twenty yards); (b) an upward adjustment of the point displayed on the mirror when the range to a target is increased from that used to determine the initial point; (c) an upward or downward adjustment of the point displayed on the mirror to factor in the type and characteristics of ammunition being used, generally based on the determined rise or drop rate of a bullet of a particular type of ammunition, in inches from the muzzle across a distance to a target (for example, a determined drop rate of three inches over a distance of one hundred yards to a target by a bullet of a particular type of ammunition); and (d) an adjustment left or right to factor in the estimated effect of wind. The adjustments maybe controlled by means of buttons (not shown) located on the forward side of the side reflector body 10 and/or on the top side with similar buttons on the bottom side, (not shown), of the side reflector body 10, and by an additional device attached to the side reflector body such as the range finder 19 shown in FIG. 4, which could be connected electrically to the electronics 26 in the side reflector body by means of electrical contacts in the guide rails 13 and in the corresponding slots (not shown) in the range finder 19 or other additional device. The apparatus of the invention is also preferably provided with a transfer means attachable to the attachment means for transferring the aiming data to an external sighting device, thereby permitting viewing of the data by an interested party, such as a shooting instructor, through the external sighting device. Such transfer means are well known to those of ordinary skill in the art. Thus, the electronics in the rear light reflector 10 may also be connected, by conventional plugs and wires (not shown), to another telescope or monitor to transmit data for use by an instructor or other person.

The apparatus of the invention is also preferably provided with a means in one or both of the light tubes 2, 9 for displaying aiming data on a viewing lens 11 A in the eye opening 11. Such display means are well known to those of ordinary skill in the art. The adjustments could be visually displayed in the viewing lens 11A of the side light reflector or by a display on the mirror or in the viewing lens. When the green laser point on the mirror 24 in the side light reflector 10 is adjusted as aforesaid, the person sighting though the viewing lens, when mounted on a rifle or other weapon, could place the red light displayed on the mirror 23 in the rear light reflector 5 on a desired point of a target, then move the rifle or other weapon to situate the green light displayed on the mirror 24 of the side light reflector on the aforesaid red light. When initially adjusted, the green light point may be set to flash when that point of light is directly centered on the red light point, or may be programmed to flash until directly on the red light point, becoming a steady green point. The telescope may be provided with different colors produced by the laser devices, as preferred by a person.

As shown in this view, the laser devices 25 and 26 may be fixed in the rear light reflector and in the side light reflector to point directly perpendicular to the center) into the mirrors, limiting the amount of light reflected through the telescope and into the eye of the person sighting through the viewing lens. The electrical power required by the lasers and the amount of reflected light may be further limited by coating the mirror with phosphors or other substances which would react at a small point to a minimal laser light.

The laser devices described above may also adjusted by gravity detectors in the electronic devices to assure that, in any position of the weapon, telescope, and/or side optics system 5–12, the lasers are oriented to true vertical and horizontal positions, and may be used to assure vertical alignment of the weapon.

FIG. 6 shows a preferred embodiment in which the light input end of the side light tube 9 is rotatably connected to the target light output end of the firing line light tube 2. In this embodiment, a locking means 28 is preferably provided on the firing line light tube 2 for locking the side light tube 9 in a selected rotation relative to the firing line light tube 2. FIG. 6 is a top view of the rotatable tube 2 in slip rings 3, rear manifold 4, rear reflector body 5 and side manifold, to show the addition of a locking ring 28 on the threads 29 at the rear of the rotatable light tube 2. In the embodiment shown in FIG. 1, the rotatable light tube 2 is firmly fixed by screwing the end of the rotatable tube into the rear manifold 4, providing maximum attachment without vibrations and limiting rotation of the side optics system 5–12 by loosening the locking devices of the slip ring supports 3, then rotating the rotatable tube 2 to a preferred position before tightening the locking devices. In the embodiment shown in FIG. 6, the rotatable tube is not firmly fixed by tightly screwing the end of the tube 2 tightly into the rear manifold 4, leaving sufficient threads to allow the rear manifold 4 to be turned, rotating the side optics system 5–12 to a desired position, then rotating a locking ring 28 on the threads 29 until it locks against the rear manifold 4, tightening both as firmly as desired. In this view, the locking ring 28 is shown unlocked (unscrewed to back it from the rear manifold). This embodiment may be preferred by a user for firmer locking of the rotatable tube 2 on the rifle or other weapon, and/or when the user prefers manual controls for the manual aiming devices (not shown) on the rotatable tube to remain in a preferred position while being able to position the side optics system 5–12 in a preferred manner.

Figure 7:
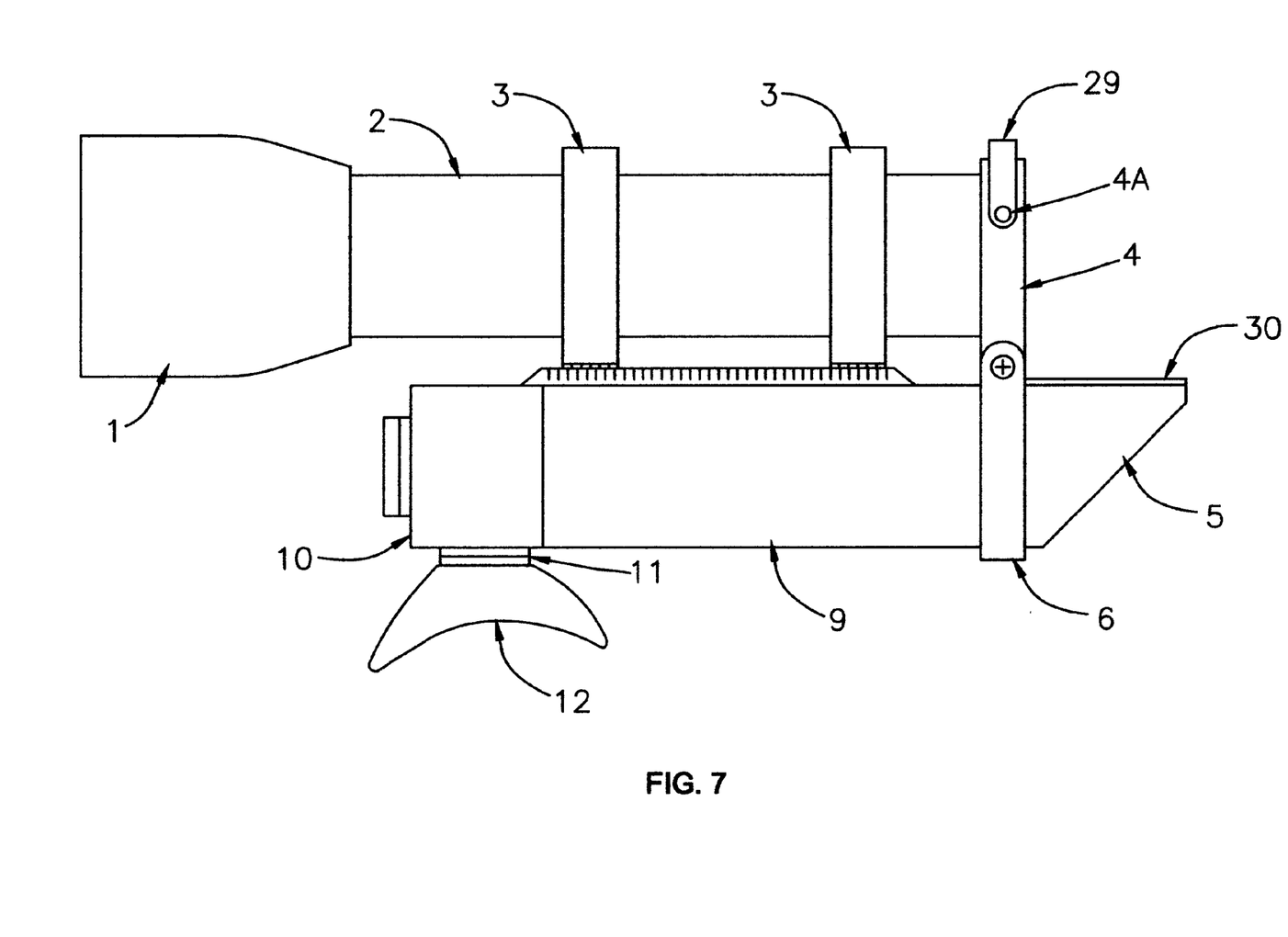
FIG. 7 is a top view of one embodiment of a folded telescope when manufactured in a configuration permitting viewing and aiming through the forward portion (firing line light tube) thereof.

FIG. 7 is a top view of the telescope with the side optics system 5–12 folded forward and locked to the slip rings 3. In this embodiment the rear reflector body 5 is fixed to the side manifold 6 and when the telescope is extended the rear reflector body may be locked to the rear manifold 4 by a swing lock arm 29 held by and rotating on pins 4a on the rear manifold 4. In this view, the swing lock arm 29 is disengaged from the locking position on the sloping rear of the rear reflector body 5 and situated on the rear manifold 4. Also shown in this view is a gasket 30 on the edge of the sides of the rear reflector body 5 which is pressed against the rear of the rear manifold 4 when the side optics system 5–12 is extended.

In this embodiment, a person may sight through the forward portion of the telescope, with the head and eye at an appropriate distance from the rear of the rear manifold 4 to focus the image through the objective lens. For convenience of use and focusing, a viewing lens (not shown) may be fixed on a holder (not shown) in the tube 2 and rotated forward in the tube 2 so that the lens and holder do not interfere with the light from the objective lens, and rotated into and focusing that light to the retina of the eye of the person viewing through the telescope at an appropriated focal distance to the rear of the rear manifold 4. The rotation of the lens and holder may be accomplished manually by a shaft (not shown) supporting the holder and lens through the side of the tube to a knob (not shown) on the outside of the tube for rotating the shaft, or by an electrical device (not shown).

Figure 8:
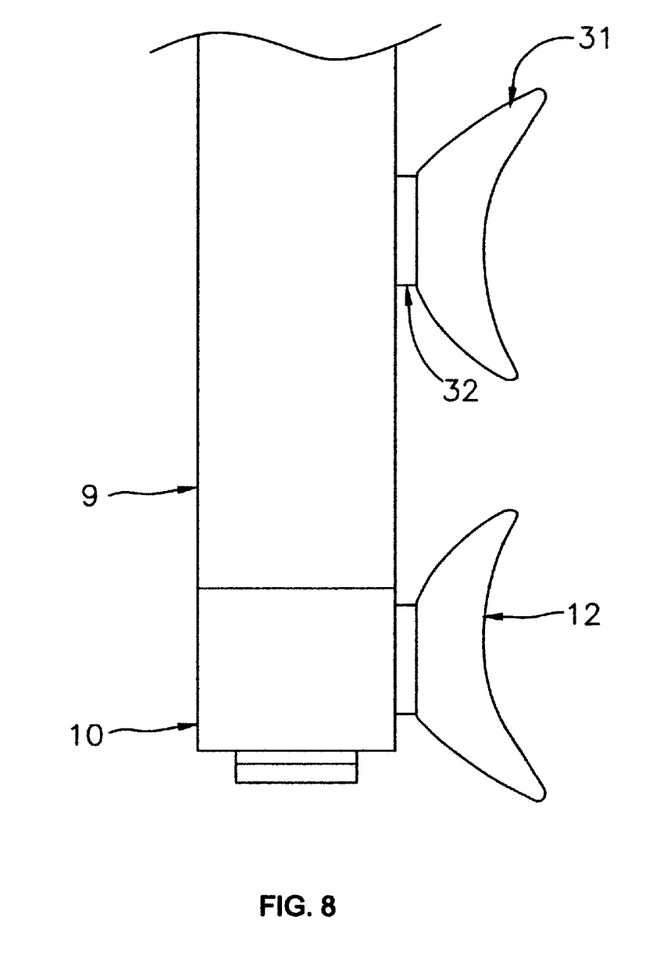
FIG. 8 is a top view of one embodiment of the side optics system modified to allow sighting through two viewing lenses.

FIG. 8 is a top view of the side optics system 5–12 showing modification of the side light tube 9 to add a second viewing lens (not shown) closer to the weapon, to which may be added a second eye hood 31, shown as turned for viewing with the eye closest to the weapon), attached to a holder 32 around the view lens. By an additional optics system (not shown) in the side light tube, the image from the objective lens (not shown) may be divided equally for display through both view lens (not shown). As this embodiment limits display of the laser sighting system in the mirror of the rear reflector body 10, where weight is not a consideration a conventional monocle viewing device may be attached to the holder 11 of the telescope as shown in FIG. 1, for viewing by both eyes, which device maybe permanently attached to a shortened side optics system 5–12 described with respect to FIG. 1.

In operation, the apparatus of the invention is used by securely mounting the apparatus to a firing weapon, such as a rifle, bow, cross-bow or the like. The apparatus is mounted such that the firing line light tube 2 is in substantially parallel relation to the firing line of the weapon, thereby permitting a user sighting through the device to aim along the firing line with the greatest probability of striking an intended target. The side light tube 9 is pivoted toward the firing line light tube 2 to form the substantially light tight junction described above, and is secured in the light-tight position by swing lock arm 8. The firing line light tube 2 is then rotated until the side light tube 9 is in a preferred position on either side of the weapon. In an alternative embodiment described above and shown in FIGS. 5 and 7, the side light tube 9 is rotated about the firing line light tube 2 until the side light tube 9 is in a preferred position on either side of the weapon, and is then locked into place with the locking ring 28.

With the side light tube properly positioned on a selected side of the weapon, a shooter then holds the firing weapon in the conventional manner and points the weapon at an intended target. By peering into the eye opening 11, the shooter is able to see reflected light from the intended target and to aim at the target through the firing line light tube 2. Firing of the weapon is achieved in the conventional manner.

In some instances, it may be preferable to aim directly through the firing line light tube 2. This can be accomplished by folding the side light tube 9 against the firing line light tube 2, securing the side light tube 9 against the firing line light tube 2 with the tube securing means 14, 17, and aiming at the target through the firing line light tube 2.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. An apparatus for aiming at a target along a firing line of a weapon, such as a rifle, bow, cross-bow or the like, comprising:
   a firing line light tube;
   a means for securely mounting said firing line light tube on said weapon in substantially parallel relation to said firing line of said weapon;
   a side light tube having an eye opening, a target light input end of said side light tube pivotally connected to a target light output end of said firing line light tube;
   a means for selectively forming a light-tight junction between said firing line light tube and said side light tube;
   a first mirror positioned to receive target light from said firing line light tube; and
   a second mirror in said side light tube, said second mirror positioned to receive said target light from said first mirror and reflect said target light through said eye opening.

2. The apparatus of claim 1, wherein said firing line light tube is selectively rotatable relative to said firing weapon, such that said side light tube may be selectively positioned on either side of said firing weapon and in other preferred positions.

3. The apparatus of claim 2, wherein said firing line light tube may be selectively positioned forward or back relative to said firing weapon.

4. The apparatus of claim 1, wherein said means for securely mounting includes one or more adjustable slip rings substantially encircling said firing line light tube, each of said slip rings having an adjustment means thereon for selectively loosening and tightening said slip rings to thereby permit selective rotation and other movements of said firing line light tube relative to said weapon.

5. The apparatus of claim 1, wherein said side light tube is rotatably connected to said target light output end of said firing line light tube.

6. The apparatus of claim 5, further comprising a locking means on said firing line light tube for locking said side light tube in a selected rotation relative to said firing line light tube.

7. The apparatus of claim 1, further comprising a means on at least one of said light tubes for removably securing said light output end of said firing line light tube to said light input end of said side light tube to thereby selectively secure said light-tight junction.

8. The apparatus of claim 7, wherein said means for removably securing is flexible.

9. The apparatus of claim 1, wherein said means for selectively forming a light-tight junction is a reflector body on said light output end of said firing line light tube, and further comprising a swing lock arm pivotally connected to said target light input end of said side light tube, said swing lock arm configured to pivot over at least a portion of said reflector body to thereby selectively secure said light input end of said side light tube against said reflector body in said light-tight junction position.

10. The apparatus of claim 9, wherein said swing lock arm is flexible.

11. The apparatus of claim 1, wherein said first mirror is positioned substantially in said light output end of said firing line light tube.

12. The apparatus of claim 1, wherein said first mirror is positioned substantially in said light input end of said side light tube.

13. The apparatus of claim 1, further comprising one or more magnifying lenses positioned in at least one of said light tubes, said lenses positioned and configured to deliver a magnified image of said target through said eye opening.

14. The apparatus of claim 1, further comprising a first gasket in said light output end of said firing line light tube and a second gasket in said light input end of said side light tube, said gaskets together providing substantially light-tight sealing of said light-tight junction.

15. The apparatus of claim 1, further comprising a means on at least one of said light tubes for removably securing said side light tube to said firing line light tube when said side light tube is folded against said firing line light tube.

16. The apparatus of claim 1, further comprising an attachment means on an outer surface of said side light tube adjacent to said light output end for permitting selective attachment of sight-enhancing accessories to said apparatus.

17. The apparatus of claim 16, further comprising a means in one or both of said light tubes for displaying aiming data on a viewing lens in said eye opening.

18. The apparatus of claim 17, further comprising a transfer means attachable to said attachment means for transferring said aiming data to an external sighting device, thereby permitting viewing of said data by an interested party, such as a shooting instructor, through said external sighting device.

19. The apparatus of claim 16, further comprising a second eye opening on said side light tube adjacent said first eye opening.

20. The apparatus of claim 1, further comprising a first laser and electronic device positioned to project one or more adjustable aiming points of light on said first mirror.

21. The apparatus of clam 20, further comprising a second laser and electronic device positioned to project one or more adjustable aiming points of light on said second mirror.

22. A method of aiming along a firing line of a weapon, such as a rifle, bow, cross-bow or the like, comprising:
   (a) providing an aiming apparatus comprising:
      a firing line light tube,
      a means for securely mounting said firing line light tube on said weapon in substantially parallel relation to said firing line of said weapon;
      a side light tube having an eye opening, a target light input end of said side light tube pivotally connected to a target light output end of said firing line light tube;
      a means for selectively forming a light-tight junction between said firing line light tube and said side light tube;
      a first mirror positioned to receive target light from said firing line light tube;
      a second mirror in said side light tube, said second mirror positioned to receive said target light from said first mirror and reflect said target light through said eye opening; and
      a means on at least one of said light tubes for removably securing said side light tube to said firing line light tube when said side light tube is folded against said firing line light tube;
   (b) securely mounting said firing line light tube on said weapon in substantially parallel relation to said firing line of said weapon;
   (c) folding said side light tube against said firing line light tube;
   (d) securing said side light tube against said firing line light tube with said tube securing means; and
   (e) aiming at said target through said firing line light tube.

* * * * *